Patented Oct. 24, 1950

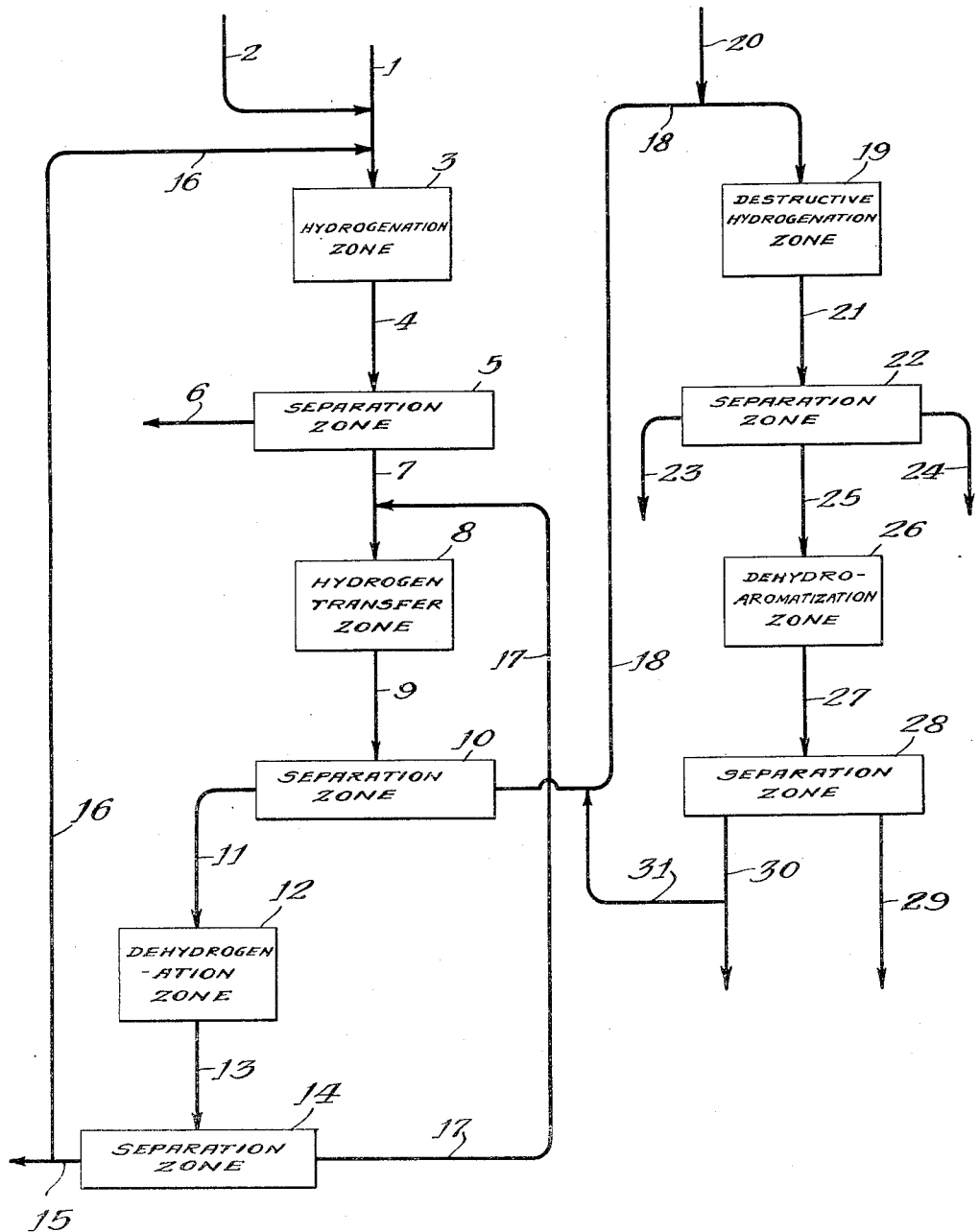

2,526,895

UNITED STATES PATENT OFFICE 2,526,895

PRODUCTION OF POLYCYCLIC AROMATIC HYDROCARBONS

Herman Pines and Vladimir N. Ipatieff, Chicago, Ill., assignors to Universal Oil Products Company, Chicago, Ill., a corporation of Delaware Application November 28, 1947, Serial No. 788,643

6 Claims. (Cl. 260—668)

This invention relates to a process for producing polycyclic aromatic hydrocarbons and particularly for producing alkylindan and naphthalene hydrocarbons.

An object of this invention is to convert a terpenic hydrocarbon into a polycyclic aromatic hydrocarbon.

Other objects of this invention are to produce 1,3,3,6-tetramethyl-1-p-tolylindan, 1,1,3,5-tetramethylindan, and alkyl naphthalenes.

One specific embodiment of this invention relates to a combination process which comprises hydrogenating a member of the group consisting of dipentene and limonene to form dihydrolimonene; reacting said dihydrolimonene in the presence of an alkylation catalyst with a p-cymene fraction formed as hereinafter set forth to effect a hydrogen transfer reaction and form a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of a dehydrogenating catalyst to form a substantially p-cymene fraction and hydrogen; directing the hydrogen to the hydrogenation step to form dihydrolimonene; conducting the p-cymene fraction to reaction with said dihydrolimonene; reacting said 1,3,3,6-tetramethyl-1-p-tolylindan and hydrogen at destructive hydrogenation conditions to form a reaction mixture containing 1,1,3,5-tetramethylindan and toluene; dehydroaromatizing said 1,1,3,5-tetramethylindan to form methyl naphthalenes and hydrogen; returning at least a portion of said hydrogen to the destructive hydrogenation step; and recovering said methyl naphthalenes.

Another embodiment of this invention relates to a process for producing 1,1,3,5-tetramethylindan which comprises hydrogenating a member of the group consisting of dipentene and limonene to form dihydrolimonene; reacting said dihydrolimonene in the presence of an alkylation catalyst with a p-cymene fraction formed as hereinafter set forth to effect a hydrogen transfer reaction and forming a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of a dehydrogenating catalyst to form a substantially p-cymene fraction and hydrogen, directing the hydrogen to the hydrogenation step to form dihydrolimonene; recycling the p-cymene fraction to further reaction with said dihydrolimonene; reacting said 1,3,3,6-tetramethyl-1-p-tolylindan and hydrogen at destructive hydrogenation conditions to form a reaction mixture containing 1,1,3,5-tetramethylindan and toluene; and recovering said 1,1,3,5-tetramethylindan and toluene.

A further embodiment of this invention relates to a process for producing 1,3,3,6-tetramethyl-1-p-tolylindan which comprises hydrogenating a member of the group consisting of dipentene and limonene to form dihydrolimonene; reacting dihydrolimonene in the presence of an alkylation catalyst with a p-cymene fraction formed as hereinafter set forth to effect a hydrogen transfer reaction and form a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of a dehydrogenating catalyst to form a substantially p-cymene fraction and hydrogen; directing the hydrogen to the hydrogenation step to form dihydrolimonene; and recycling the p-cymene fraction to further reaction with said dihydrolimonene.

A still further embodiment of this invention relates to a process for producing methyl naphthalenes which comprises destructively hydrogenating 1,3,3,6-tetramethyl-1-p-tolylindan to form a reaction mixture comprising essentially 1,1,3,5-tetramethylindan and toluene, separating said 1,1,3,5-tetramethylindan and toluene; and dehydroaromatizing the former to produce methyl naphthalenes and hydrogen; recovering said methyl naphthalenes; and returning at least a portion of said hydrogen to the destructive hydrogenation step.

By the process of this invention, polycyclic aromatic hydrocarbons are formed by a combination of treating steps starting with a terpenic hydrocarbon having a ring of six carbon atoms, a methyl group and an isopropyl or isopropenyl group in the 1,4 positions and containing two double bonds per molecule. This process is particularly applicable to limonene which is optically active, to dipentene which is optically inactive and to various isomeric hydrocarbons such as alpha-terpene, beta-terpene, etc. Each of these terpenic hydrocarbon starting materials is a monocyclic terpenic hydrocarbon having a ring of six carbon atoms, a methyl group and a three-carbon group in the 1,4-positions to each other and containing two double bonds per molecule. Some of the double bonds may be located in the ring and some in the side chain or they may be in the ring only.

The polycyclic aromatic hydrocarbons which are formed in this process include 1,3,3,6-tetramethyl-1-p-tolylindan, 1,1,3,5-tetramethylindan, and methylated naphthalenes, while in the course of the process the monocyclic aromatic hydrocarbons toluene and p-cymene are also formed. In the manner that this combination process is carried out, the p-cymene is used as an intermediate for the production of the polycyclic hydrocarbons while toluene results as a by-product of the destructive hydrogenation step which produces 1,1,3,5-tetramethylindan.

The process of this invention is described more fully by references to the attached diagrammatic drawing which is a flow diagram showing the sequence of treating steps so employed.

As indicated in the drawing, a terpenic hydrocarbon starting material such as limonene, dipentene and the like is introduced through line 1, in which it is commingled with hydrogen supplied from an outside source through line 2, or hydrogen formed in the process and recycled through line 16. The mixture of terpenic hydrocarbon and hydrogen or these separate reactants are directed to hydrogenation zone 3, containing a suitable hydrogenation catalyst such as nickel, copper, and the like, maintained at a temperature of from about 25° to about 150° C. and at an operating pressure of from about 10 to about 120 atmospheres such that selective hydrogenation of the terpenic hydrocarbon occurs to produce dihydrolimonene or an isomeric cyclic hydrocarbon having a 6-membered ring containing one double bond.

From hydrogenation zone 3, the reaction mixture is directed through line 4 to separation zone 5 from which unreacted hydrogen is discharged through line 6 and the dihydrolimonene is conducted through line 7 to hydrogen transfer zone 8, which comprises an alkylation reactor or other suitable treating vessel in which the dihydrolimonene and p-cymene, the latter supplied from a later step of the process by way of line 17, may be contacted at hydrogen transfer conditions in the presence of an acidic catalyst particularly a mineral acid such as sulfuric acid, chlorosulfonic acid, fluorosulfonic acid, hydrogen fluoride, hydroxy borofluoric acid, a fluorophosphoric acid, etc. although Friedel-Crafts metal halides and boron trifluoride may also be used.

In hydrogen transfer zone 8, a hydrogen exchange occurs between two molecular proportions of p-cymene and two molecular proportions of the cycloolefin forming 1,3,3,6-tetramethyl-1-p-tolylindan and p-menthane.

The reaction mixture so produced in hydrogen transfer zone 8 is directed through line 9 to separation zone 10, which comprises a fractional distilling column or other suitable device in which a mixture of p-menthane and p-cymene, the latter not converted in zone 8, is separated from the higher boiling reaction products comprising essentially 1,3,3,6-tetramethyl-1-p-tolylindan. The mixture of p-menthane and p-cymene is directed from separation zone 10 through line 11 to dehydrogenation zone 12 containing a suitable dehydrogenation catalyst such as a composite comprising aluminum oxide and an oxide of a metal selected from the metals of the left-hand columns of groups 4, 5, and 6 of the periodic table, including particularly vanadium, chromium and molybdenum oxides supported by alumina.

Dehydrogenation zone 12 is generally operated at atmospheric pressure and at a temperature of from about 400° to about 700° C. when employing the catalyst mentioned above, although this dehydrogenation treatment may be carried out at a temperature of from about 200° to about 300° C. in the presence of a catalyst containing a metal of the platinum group such as platinum or palladium supported by alumina. The reaction mixture formed in dehydrogenation zone 12 and comprising essentially p-cymene and hydrogen is directed therefrom through line 13 to separation zone 14, in which the gaseous products containing a relatively high proportion of hydrogen are separated and discharged through line 15 and from which at least a portion of this hydrogen containing gas is recycled through line 16 to commingle with the terpenic hydrocarbon charged to hydrogenation zone 3. A substantially p-cymene fraction is directed from separation zone 14, through line 17 and recycled to line 7 already mentioned through which dihydrolimonene is also introduced to hydrogen transfer zone 8.

From separation zone 10, the 1,3,3,6-tetramethyl-1-p-tolylindan is conducted through line 18 to destructive hydrogenation zone 19. Hydrogen from an outside source or a portion of that formed in the process is added through line 20. Destructive hydrogenation zone 19 may comprise a suitable reactor or other vessel capable of use at a destructive hydrogenation temperature and pressure and containing a hydrogenation catalyst. The catalysts usable in this step of the process are those which catalyze the hydrogenation of an olefinic double bond but which do not catalyze the hydrogenation of the benzenoid ring at a temperature below about 200° C. These catalysts may contain as components the oxides of molybdenum, chromium, vanadium, copper, cobalt, iron, zinc, manganese, and silver. These oxides may be used individually or in combination with each other or in combination with clays or oxides or silicon, aluminum, zirconium, and titanium. The temperature at which the destructive hydrogenation treatment is carried out depends upon the polycyclic aromatic hydrocarbons undergoing treatment and the catalysts employed. Temperatures of from about 250° to about 350° C. are generally preferred but temperatures from about 150° to about 500° C. are frequently employed. The initial hydrogen pressure used in this step may be from about 10 to about 150 atmospheres but pressures of from about 50 to about 120 atmospheres are preferred.

The reaction mixture formed in destructive hydrogenation zone 9 and comprising essentially polyalkyl indans, toluene and hydrogen, is directed through line 21 to separation zone 22 which comprises fractional distilling equipment suitable for separating hydrogen and toluene from the alkylated indan hydrocarbons. Hydrogen is discharged from separation zone 22 to line 23 to waste or to further use not illustrated in the diagrammatic drawing, while the toluene fraction is discharged from separation zone 22 through line 24 to cooling and storage or other use not illustrated in the drawing.

When it is desired to convert the polyalkylated indan hydrocarbons to naphthalene hydrocarbons, the indan hydrocarbon fraction is conducted from separation zone 22 through line 25 to dehydroaromatization zone 26.

Dehydroaromatization zone 26 contains a catalyst such as a composite of chromium oxide and aluminum oxide capable of dehydrogenating and converting a polyalkylated indan hydrocarbon into a polyalkylated naphthalene hydrocarbon. In this treatment the five membered ring of indan undergoes dehydrogenation and expansion or expansion and dehydrogenation to a six membered ring to form an alkylated naphthalene hydrocarbon. This step of the process is carried out at a temperature of from about 300° to about 500° C. and at a pressure of from subatmospheric to slightly superatmospheric and generally not in excess of about 10 atmospheres. The dehydroaromatization products are directed from zone 26 through line 27 to separation zone 28 in which hydrogen is separated from alkylated naphthalenes. The alkylated naphthalene such as dimethylnaphthalene is withdrawn from separation zone 28 through line 29 and the hydrogen fraction is discharged through line 30. At least a portion of the hydrogen fraction is directed from line 30 through line 31 to line 18 and recycled to destructive hydrogenation zone 19 already mentioned.

This combination process for converting terpenic hydrocarbons into polycyclic aromatic hydrocarbons is illustrated further by the following example:

53.5 grams (0.4 mole) of para-cymene and 67 grams of substantially anhydrous hydrogen fluoride were placed in a copper-lined reactor provided with a mechanically driven copper stirrer and the reaction mixture was cooled to a temperature of 0° to about 10° C. The cooled reaction mixture was then stirred while a mixture of 53.5 grams (0.4 mole) of para-cymene and 55 grams (0.4 mole) of dihydrolimonene, the latter formed by selective hydrogenation of limonene, was added thereto during a period of one hour and the stirring was continued for 0.5 hour. The catalyst layer was then separated from the hydrocarbon layer and the latter was washed, dried, and distilled. 59 grams (0.44 mole) of para-cymene was recovered, thus indicating that 0.36 mole of para-cymene had entered the reaction. The hydrocarbon product contained 40 grams (0.29 mole) of saturated hydrocarbons comprising essentially para-menthane, (that is para - methyl - isopropylcyclohexane) and 41 grams (0.15 mole) of 1,3,3,6 - tetramethyl - 1 - p - tolylindan.

Dehydrogenation of the saturated hydrocarbon material comprising essentially p-menthane in the presence of platinized alumina at 240° C. formed p-cymene suitable for reaction with dihydrolimonene in the hydrogen transfer step to form 1,3,3,6-tetramethyl-1-p-tolylindan and p-menthane.

27 grams of 1,3,3,6-tetramethyl-1-p-tolylindan formed as herein described was heated in the presence of 4 grams of a co-precipitated mixture of 60% CuO and 40% of $Al_2O_3$. This treatment was carried out in a steel reactor at a temperature of 270° C. and at an initial hydrogen pressure of 120 atmospheres and 25° C. The maximum pressure was 230 atmospheres during the destructive hydrogenation treatment and the final pressure was 106 atmospheres at a temperature of 28° C. Distillation of the liquid products separated therefrom the following fractions:

| Fraction | Boiling Point, °C. | Pressure | Grams | $n_D^{20}$ |
|---|---|---|---|---|
|  |  | Mm. Hg |  |  |
| 1 | 108-110 | 760 | 3.5 | 1.4940 |
| 2 | 110-210 | 760 | 2.0 | 1.4987 |
| 3 | 210-212 | 760 | 6.5 | 1.5071 |
| 4 | 158 | 4 | 12.5 | 1.5545 |

Fraction 1 consisted of toluene, identified by nitration as dinitrotoluene melting at 70°.

Fraction 3 corresponds to tetramethylindan

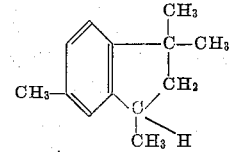

Analysis: Calcd. for $C_{13}H_{18}$: C, 89.66; H, 10.34. Found: C, 89.47; H, 10.50.

Sulfonamide of the tetramethylindan melted at 123–124°.

Analysis: Calcd. for $C_{13}H_{19}SO_2N$: N, 5.47. Found: N, 5.46.

Thus 1,1,3,5-tetramethylindan was formed in the destructive hydrogenation treatment. Some of the 1,1,3,5-tetramethylindan on further treatment with a dehydration catalyst such as chromia-alumina at a temperature of 420° C. yielded a reaction mixture containing hydrogen, methane, and polymethylated naphthalene hydrocarbons, namely, 1,6-dimethylnaphthalene.

We claim as our invention:

1. A combination process which comprises hydrogenating a monocyclic terpenic hydrocarbon having a ring of silk carbon atoms, a methyl group and a three-carbon atom group in the 1,4-positions to each other and containing two double bonds per molecule to form a dihydroterpene; reacting said dihydroterpene in the presence of an alkylation catalyst with a p-cymene fraction formed as hereinafter set forth to effect a hydrogen transfer reaction and form a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of dehydrogenating catalyst to form a substantially p-cymene fraction and hydrogen; directing the hydrogen to the hydrogenation step to form dihydroterpene; and conducting the p-cymene fraction to reaction with said dihydroterpene.

2. A combination process which comprises hydrogenating a member of the group consisting of dipentene and limonene to form dihydrolimonene; reacting said dihydrolimonene in the presence of an alkylation catalyst with a p-cymene fraction formed as hereinafter set forth to effect a hydrogen transfer reaction and form a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of a dehydrogenating catalyst to form a substantially p-cymene fraction and hydrogen; directing the hydrogen to the hydrogenation step to form dihydrolimonene; and conducting the p-cymene fraction to reaction with said dihydrolimonene.

3. A process which comprises reacting dihydrolimonene in the presence of an alkylation catalyst with a p-cymene fraction formed as hereinafter set forth to effect a hydrogen transfer reaction and form a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of a dehydrogenating catalyst to form a substantially p-cymene fraction and conducting the p-cymene fraction to further reaction with said dihydrolimonene.

4. A process for producing 1,3,3,6-tetramethyl-1-p-tolylindan which comprises hydrogenating a member of the group consisting of dipentene and limonene to form dihydrolimonene; reacting dihydrolimonene in the presence of an alkylation catalyst with a p-cymene fraction formed as hereinafter set forth to effect a hydrogen transfer reaction and form a reaction mixture comprising essentially 1,3,3,6-tetramethyl-1-p-tolylindan, p-menthane and unconverted p-cymene; separating a mixture of p-menthane and unconverted p-cymene from said reaction mixture; recovering the 1,3,3,6-tetramethyl-1-p-tolylindan; reacting the mixture of p-menthane and unconverted p-cymene in the presence of a dehydrogenating catalyst to form a substantially p-cymene fraction and hydrogen; directing the hydrogen to the hydrogenation step to form dihydrolimonene; and conducting the p-cymene fraction to reaction with said dihydrolimonene.

5. A process for producing 1,3,3,6-tetramethyl-1-p-tolylindan which comprises reacting dihydrolimonene with p-cymene in the presence of an alkylation catalyst under conditions to effect a hydrogen exchange between two molecular proportions of the p-cymene and two molecular proportions of the dihydrolimonene.

6. A process for producing 1,3,3,6-tetramethyl-1-p-tolylindan which comprises reacting dihydrolimonene with p-cymene in the presence of a hydrogen fluoride catalyst at a temperature of from about 0° C. to about 10° C.

HERMAN PINES.
VLADIMIR N. IPATIEFF.

REFERENCES CITED

The following references are of record in the file of this patent:

UNITED STATES PATENTS

| Number | Name | Date |
|---|---|---|
| 2,180,814 | Mattox et al. | Nov. 21, 1939 |
| 2,328,756 | Thomas | Sept. 7, 1943 |
| 2,341,782 | Ipatieff et al. | Feb. 15, 1944 |
| 2,387,794 | Hull | Oct. 30, 1945 |
| 2,416,965 | Thomas et al. | Mar. 4, 1947 |

FOREIGN PATENTS

| Number | Country | Date |
|---|---|---|
| 341,997 | Great Britain | Jan. 29, 1931 |

OTHER REFERENCES

Puranen, Chem. Abs., vol. 27, pages 5062, 3 (1933) (2 pages).

Certificate of Correction

Patent No. 2,526,895                                                  October 24, 1950

HERMAN PINES ET AL.

It is hereby certified that error appears in the printed specification of the above numbered patent requiring correction as follows:

Column 6, line 39, for the word "silk" read *six*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*